Jan. 13, 1970    D. E. BURROUGH    3,488,980

TORQUE LIMITING CLUTCH

Filed May 29, 1968

INVENTOR.
D. E. BURROUGH

BY
R L Hollister

AGENT

3,488,980
Patented Jan. 13, 1970

3,488,980
TORQUE LIMITING CLUTCH
Donald E. Burrough, Ottumwa, Iowa, assignor to Deere & Company, Moline, Ill., a corporation of Delaware
Filed May 29, 1968, Ser. No. 733,139
Int. Cl. F16d 7/02
U.S. Cl. 64—30       9 Claims

ABSTRACT OF THE DISCLOSURE

A slip clutch including an axial piston pump having the cylinder barrel and swash plate secured to the input and output portions of a drive line respectively. Fluid is trapped in the cylinders by a relief valve set to open at a predetermined pressure so that as long as the maximum pressure determined by the relief valve is not reached, the contact between the swash plate and pistons will prevent relative rotation between the cylinder barrel and swash plate. When the torque builds the fluid pressure up to the predetermined value, the relief valve opens and permits the pistons to move into the cylinders and thereby permits relative rotation between the input and output portions of the drive line.

BACKGROUND OF THE INVENTION

The present invention relates generally to a slip clutch between the input and output portions of a drive line, and more particularly to such a clutch which utilizes hydraulic pressure to provide the clutching means for normal operation and to limit the maximum torque output.

The most common form of slip clutch presently used is of the type having jaw teeth spring loaded against each other to slip and thereby disengage when the applied torque exceeds a predetermined value. However, such clutches chatter noisily after the driving connection is broken, thus requiring prompt shutoff of the power source if substantial wear or failure is to be avoided. To overcome the problems inherent in the jaw teeth type slip clutch, attempts have been made to utilize slip clutches in which hydraulic pressure provides the clutching means and a relief valve determines the maximum torque which can be transmitted by the coupling. Examples of these hydraulic pressure controlled slip clutches are illustrated in U.S. Patents 2,575,475, issued Nov. 20, 1951 to Robert E. Stutzke, and 2,986,024, issued May 30, 1961 to Basil D. Power and Langley Green. The hydraulic pressure controlled slip clutches heretofore known provide satisfactory results when used in drive lines which had relatively low torque requirements, but were not capable of handling high torque loads due to the excessively high fluid pressure requirements.

SUMMARY OF THE INVENTION

An object of the present invention is to provide a slip clutch in which hydraulic pressure provides a driving torque and in which the maximum driving torque is determined by a pressure relief valve which controls the maximum pressure available in the clutch.

Another object of the present invention is to provide a hydraulic pressure controlled slip clutch which is capable of transmitting high torque loads without the use of excessively high fluid pressure.

Yet another object of the present invention is to provide a hydraulic pressure controlled slip clutch in which the pressure provides a driving torque by generating frictional forces between relatively rotatable members which are fixed to the input and output portions of a drive line.

A still further object of the present invention is to provide a hydraulic pressure controlled slip clutch which is of simple construction and is highly stable and dependable.

The objects of the present invention are accomplished by providing an axial piston pump between the input and output shafts of the drive line. The pump housing is secured to one of the shafts for rotation, therewith, the cylinder barrel is fixed to the housing, and the swash plate is secured to the other shaft for rotation therewith. The fluid is trapped in the cylinders by a pressure relief valve so that as long as the maximum pressure determined by the pressure relief valve is not reached, the contact between the swash plate and pistons will cause the swash plate to rotate with the pump housing. Additional driving torque is created by placing a friction element between the swash plate and the housing wall to counteract the axial forces between the pistons and the swash plate and resist relative rotation between the housing and swash plate.

The above objects and details of construction will become apparent along with further objects and advantages from a reading of the following detailed description taken in conjunction with the accompanying drawing.

DESCRIPTION OF THE PREFERRED EMBODIMENTS

Figure 1:
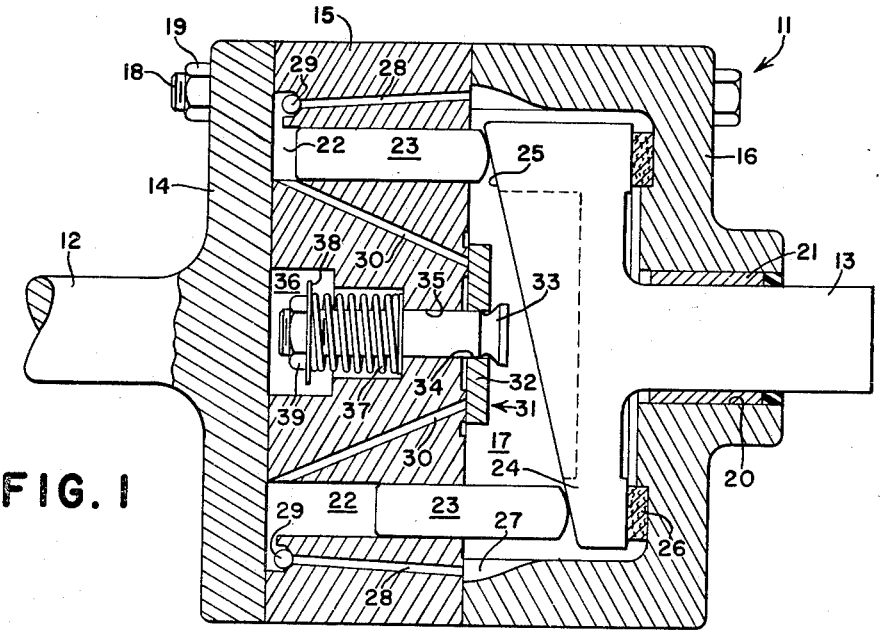
FIGURE 1 is a sectional view of a torque limiting clutch construction in accordance with the principles of the present invention.

Referring now to the drawing, and particularly to FIG. 1, a slip clutch indicated generally at 11 is illustrated as positioned between the input shaft 12 and output shaft 13 of a drive line. The slip clutch 11 includes a housing constructed from an end cap 14, an intermediate cylinder barrel section 15, and a hollow end section 16. The hollow end section 16 and the intermediate cylinder barrel section 15 form a chamber 17. The three pieces 14, 15, and 16 of the housing are held together by a plurality of bolts 19 and nuts 19. Only one set of the bolts and nuts are illustrated for simplification purposes. Suitable gaskets or seals (not illustrated) are preferably positioned between the respective pieces of the housing to form a fluid-tight structure.

As illustrated in the drawing, the end cap 14 of the slip clutch 11 is formed as an integral part of the input shaft 12, and the output shaft 13 extends through an opening 20 provided in the end wall of the section 16 and is journaled therein by a suitable bushing 21.

The cylinder barrel section 15 is provided with a plurality of cylinders 22 which are arranged axially with respect to the axis of rotation of the shafts 12 and 13. One end of each cylinder 22 is closed by the end cap 14 while the other end of each cylinder 22 communicates with the chamber 17. A plurality of postons 23 are reciprocally mounted within the cylinders 22 and one end of each piston 23 projects into the chamber 17.

A swash plate 24 is positioned within the shaft 17 and is formed as an integral part of the shaft 13. The inclined face 25 of the swash plate 24 engages the ends of the pistons 23 which project into the chamber 17. An annular friction plate 26 is positioned between the swash plate 24 and the end wall of the hollow housing section 16 and counteracts the axial force exerted by the pistons 23 on the swash plate 24.

The housing is initially filled with fluid, and the fluid contained in the chamber 17 can flow to the closed end of the cylinders 22 by way of the enlarged portion 27 of the chamber 17 and the passageways 28. Ball check valves 29 prevent any reverse flow of the fluid through the passageways 28. Additional passageways 30 are provided for the flow of fluid from the cylinders 22 to the chamber 17, but the passageways 30 are normally closed by a spring loaded relief valve indicated generally at 31. The relief valve 31 includes a plate 32 which normally covers the ends of the passageways 30 and is held in position by a bolt 33 which extends through an opening 34 in the plate 32 and a bore 35 which extends between the chamber 17 in a spring chamber 36. A spring 37 surrounds the bolt 33 and is held in position thereon by a washer 38 and nut 39. The spring 37 acts between the washer 38 and a wall of the chamber 36 to urge the bolt 33 into the chamber 36 to hold the plate 32 in a position closing the passageways 30. The tension of the spring 37 and hence the fluid pressure required to move the plate 32 from the passageways 30 can be preadjusted by loosening or tightening the nut 39 on the bolt 33.

The operation of the above-described slip clutch is as follows. As the input shaft 12 and hence the clutch is rotated, the fluid in the chamber 17 is thrown outwardly due to centrifugal force. This creates a positive pressure that forces fluid through the passageways 28 and into the lower part of those cylinders 22 that are on a no load portion of the swash plate and thereby forces the corresponding pistons out against the inclined face 25 of the swash plate. The fluid is trapped under the pistons when it moves into the load portion of the swash plate due to the action of the ball check valves 29.

Since the pistons are held in position against the inclined surface on the swash plate, the output shaft 13 is caused to rotate with the input shaft 12. The driving torque is generated by the forces at the inclined face of the swash plate 24 and consists of the frictional forces and the angular contact between the pistons 23 and the swash plate 24. An additional driving torque is created by the axial force between the pistons and their contact surface on the inclined face of the swash plate 24 which is counteracted by the thrust surface between the annular friction plate 26 and swash plate 24. This last force is resolved in an effective torque due to the frictional force and its effective friction circle.

Since the pressure under the pistons is generated by the resisting torque of the output shaft 13, it is sensitive to the torque output and limits the maximum torque output by opening the pressure relief valve 31 when the predetermined maximum pressure is reached.

Figure 2:
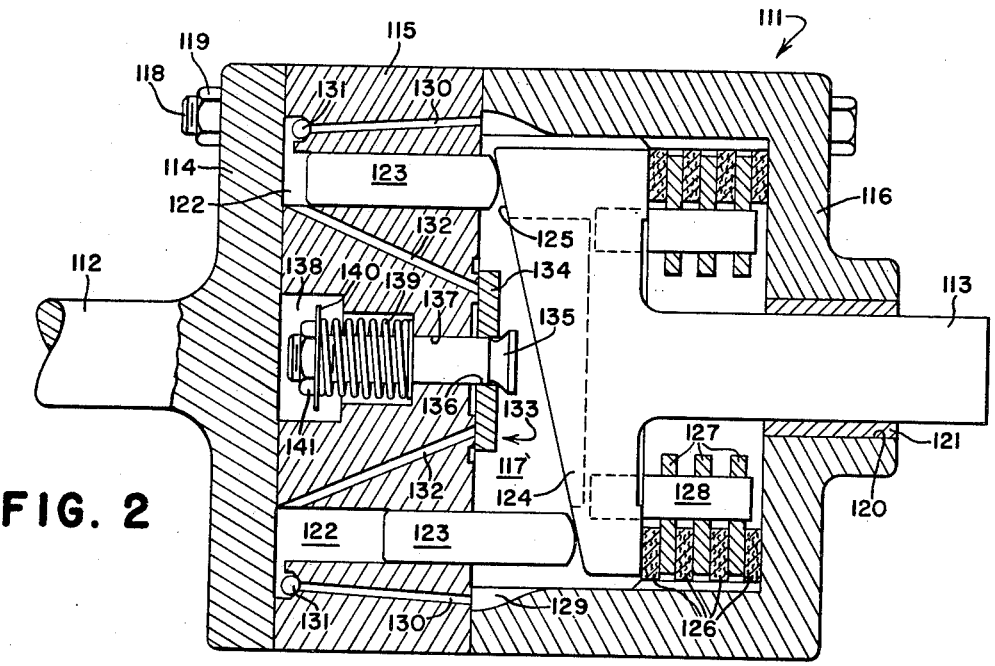
FIGURE 2 is a view similar to FIG. 1 but illustrating a slightly modified form of the invention.

Referring now to FIG. 2, a slightly modified slip clutch is indicated generally at 111 as being secured between the input shaft 112 and output shaft 113 of a drive line. The slip clutch 111 includes a three-piece housing which includes an end cap 114, an intermediate cylinder barrel section 115, and a hollow end section 116 which cooperates with the intermediate section 115 to form a chamber 117. The three sections of the housing are held together by a plurality of bolts 118 and nuts 119. Only one set of the bolts and nuts are illustrated for simplification purposes.

As illustrated in the drawing, the end cap 114 is formed as an integral part of the input shaft 112 while the output shaft 113 extends through an opening 120 provided in the end wall of the hollow end section 116 and is journaled therein by a bushing 121.

The intermediate cylinder barrel section is provided with a plurality of cylinders 122 which are arranged axially with respect to the axis of rotation of the shafts 112 and 113. The cylinders 122 are closed at one end by the end cap 114 and open into the chamber 117 at the other end. A plurality of pistons 123 are reciprocally mounted in the cylinders 122 and each has one end thereof projecting into the chamber 117.

A swash plate 124 is positioned within the chamber 117 and is formed as an integral part of the output shaft 113. The inclined face 125 of the swash plate 124 engages the projecting ends of the pistons 123 and forces the pistons 123 into the cylinders 122 whenever relative rotation between the shafts 112 and 113 occurs. A plurality of annular friction plates 126 are splined to the hollow end section 116 and are engaged with a plurality of annular friction disks 127 carried by studs 128 which are fixed to the swash plate 124.

The housing is initially filled with fluid, and the fluid in chamber 117 can flow to the closed end of cylinders 122 via the enlarged portions 129 of the chamber 117 and passageways 130. Ball check valves 131 prevent reverse flow of fluid through the passageways 130. Additional passageways 132 are provided for the flow of fluid from the cylinders 122 to the chamber 117 whenever the fluid pressure under the pistons 123 is high enough to open a pressure relief valve indicated generally at 133. The pressure relief valve 133 includes a plate 134 which normally covers the ends of the passageways 132 and is held in position by a bolt 135 which extends through an opening 136 provided in the plate 134 and a bore 137 which interconnects the chamber 117 and a spring chamber 138. A spring 139 surrounds the bolt 135 within the chamber 138 and is held in position by a washer 140 and a nut 141. The spring 139 acts between the washer 140 and a wall of the chamber 138 to normally urge the bolt 135 into the chamber 138 to hold the plate 134 in a position closing the passageways 132. The tension of the spring 139 and hence the pressure required to open the relief valve 133 can be preadjusted by loosening or tightening the bolt 141. The tension of the spring 139 is adjusted so that the relief valve 133 will open at a predetermined pressure so that the clutch 111 will begin to slip at a predetermined torque load.

The slip clutch illustrated in FIG. 2 operates in the same manner as that illustrated in FIG. 1, but because of the multiple friction plates, the clutch illustrated in FIG. 2 is capable of transmitting larger torque loads than the clutch illustrated in FIG. 1. If the clutch illustrated in FIG. 2 is used to transmit the small torque loads, the hydraulic portion would function only as a sensing device to provide and limit the pressure on the friction plates since the pressure required in the hydraulic portion of the clutch and the pressure between the pistons 123 and swash plate 124 would be lowered to a point where the frictional forces and the angular contact between the pistons 123 and swash plate 124 would be negligible as compared to the frictional forces between the friction plates 126 and the friction disks 127.

I claim:
1. A torque limiting clutch comprising: a rotatable housing forming a fluid chamber; a plurality of cylinders in said housing arranged axially with respect to the axis of rotation of said housing and opening into said chamber; a plurality of pistons reciprocally mounted in said cylinders and projecting into said chamber; fluid passageway means connecting said chamber with the ends of said cylinders remote from said chamber; valve means associated with said passageway means for permitting free flow of fluid from said chamber to said cylinders and for resisting flow of fluid from said cylinders to said chamber; a shaft rotatably journaled in said housing along the axis of rotation of said housing and projecting into said chamber; and a swash plate in said chamber fixed to the end of said shaft in driving relation with said pistons.

2. A clutch as set forth in claim 1 wherein a friction plate is positioned between said housing and the side of said swash plate remote from said pistons to counteract the axial force between said pistons and swash plate and to resist rotation of said swash plate with respect to said housing.

3. A clutch as set forth in claim 1 wherein a plurality of friction plates are keyed to said housing for axial movement between an end wall of said housing and the side of said swash plate remote from said pistons; and a plurality of friction plates are carried by said swash plate for axial movement and engage said first mentioned friction plates.

4. A clutch as set forth in claim 1 wherein said passageway means include a plurality of first passageways interconnecting said chamber and the ends of said cylinders remote from said chamber, and a plurality of second passageways interconnecting said chamber and the ends of said cylinders remote from said chamber.

5. A clutch as set forth in claim 4 wherein said valve means includes a plurality of one way valve means associated with said first passageways permitting flow from said chamber to said pistons and preventing reverse flow, and a pressure relief valve associated with said second passageways preventing flow from said cylinders to said chamber at low pressures and permitting flow after a predetermined high pressure is reached.

6. A torque limiting clutch comprising: an axial piston pump including a rotatable housing forming a chamber, drive means associated with said housing, a cylinder barrel including a plurality of axially arranged cylinders forming part of said housing, a plurality of pistons reciprocally mounted in said cylinders and projecting into said chamber, inlet ports and valve means associated with said cylinders, outlet ports and pressure relief valve means associated with said cylinders, a swash plate in said chamber and drivingly engaging said pistons, and an output shaft journaled in said housing and secured to said swash plate.

7. A clutch as set forth in claim 6 wherein said inlet and outlet ports communicate with said chamber.

8. A clutch as set forth in claim 6 wherein the axial force between said pistons and swash plate urges said swash plate toward an axial end of said housing, and a friction plate is positioned between said swash plate and said axial end of said housing.

9. A clutch as set forth in claim 6 wherein the axial forces between said pistons and said swash plate urge said swash plate toward an axial end of said housing, a plurality of friction plates are keyed to said housing for axial movement between said axial end and said swash plate, and a plurality of friction plates are carried by said swash plate for axial movement and engage said first mentioned friction plates.

References Cited
UNITED STATES PATENTS

| | | | |
|---|---|---|---|
| 1,919,437 | 7/1933 | Le Fevre | 64—26 X |
| 2,511,518 | 6/1950 | Stephens | 192—56 X |
| 2,565,579 | 8/1951 | Thorner | 64—26 X |
| 2,575,475 | 11/1951 | Stutzke | 64—26 |
| 2,872,794 | 2/1959 | Slomer | 64—30 |

FRED C. MATTERN, JR., Primary Examiner

W. S. RATLIFF, JR., Assistant Examiner

U.S. Cl. X.R.
192—56